(12) United States Patent
Zhang

(10) Patent No.: US 10,981,367 B2
(45) Date of Patent: Apr. 20, 2021

(54) APPLICATOR DEVICE FOR A PROTECTOR COVERING AND ITS APPLICATION

(71) Applicant: Ping Zhang, Bradfordwoods, PA (US)

(72) Inventor: Ping Zhang, Bradfordwoods, PA (US)

( * ) Notice: Subject to any disclaimer, the term of this patent is extended or adjusted under 35 U.S.C. 154(b) by 87 days.

(21) Appl. No.: 16/565,577

(22) Filed: Sep. 10, 2019

(65) Prior Publication Data

US 2021/0070028 A1    Mar. 11, 2021

(51) Int. Cl.
*B32B 7/12* (2006.01)
*B32B 37/00* (2006.01)
*B32B 17/06* (2006.01)

(52) U.S. Cl.
CPC .............. *B32B 37/025* (2013.01); *B32B 7/12* (2013.01); *B32B 17/06* (2013.01); *B32B 2457/00* (2013.01)

(58) Field of Classification Search
CPC ......... B32B 37/025; B32B 7/12; B32B 17/06; B32B 2457/00
See application file for complete search history.

(56) References Cited

U.S. PATENT DOCUMENTS

| 2013/0316133 A1* | 11/2013 | Kim | B32B 3/02 428/137 |
| 2019/0239372 A1* | 8/2019 | Park | C09J 7/22 |

* cited by examiner

*Primary Examiner* — Vishal I Patel
(74) *Attorney, Agent, or Firm* — IPro, PLLC

(57) ABSTRACT

Disclosed herein is an applicator device for applying a protective covering for an electronic device, comprising: a plate, a back piece and an opening on a top surface of the plate; wherein the opening is sized to fit around a raised section of an electronic device; wherein the opening and the back piece forms a chamber to allow the protective covering for a raised section of the electronic device to fit inside; wherein a depth of the chamber is greater than a depth of the protective covering. Disclosed herein is a method of using the applicator device, comprising removing a top sheet from the applicator device, aligning a perimeter of the opening to a perimeter of the raised section for allowing the protective covering to align and cover the raised section, exerting a pressure to release the protective covering from the back piece so that the protective covering is adherent to the raised section.

13 Claims, 6 Drawing Sheets

APPLICATOR DEVICE FOR A PROTECTOR COVERING AND ITS APPLICATION

TECHNICAL FIELD

The disclosure herein relates an applicator device for a protective covering, and in particular, an applicator device for a protective covering to a raised section such as a camera bump of an electronic device.

BACKGROUND

With the increasing demand for better photo quality, camera bumps that house one or more cameras have become a staple part of many smartphone. Camera bump is often a more preferred design than a thicker phone. In some smartphone models, a camera bump on a phone may house three rear camera lenses and a flash. Camera bump is raised above the flat surface of an electronic device, and this raised section presents a challenge. Because putting the electronic device on a surface such as a desk may result in the device resting on the camera bump, and this may scratch the lens in the rear cameras. Therefore, the use of camera bump requires additional protective covering for protecting rear camera lens from scratches in daily use.

SUMMARY

Disclosed herein is an applicator device for applying a protective covering for an electronic device, comprising: a plate, a back piece and an opening on a top surface of the plate; wherein the opening is sized to fit around a raised section of an electronic device; wherein the opening and the back piece forms a chamber to allow the protective covering for a raised section of the electronic device to fit inside; wherein a depth of the chamber is greater than a depth of the protective covering.

According to an embodiment, the depth of the chamber is greater than a sum of the depth of the protective covering and a protrusion distance of the raised section from a surface of the electronic device.

According to an embodiment, the back piece comprises a bonding material for bonding to the plate and the protective covering.

According to an embodiment, the applicator device further comprises the protective covering secured inside the chamber through bonding to the back piece, and wherein after applying of the protective covering by the applicator device, the protective covering is to be released off from the back piece and adhered to the raised section of the electronic device through a pressure exerted by a user's hand on the back piece.

According to an embodiment, the opening is a through hole, and the back piece is a liner.

According to an embodiment, the applicator device further comprises the protective covering that is sized to cover a portion or all of the raised section of the electronic device.

According to an embodiment, the protective covering is a protective film.

According to an embodiment, the protective covering is a tempered glass.

According to an embodiment, the protective covering comprises an internal opening.

According to an embodiment, the applicator device further comprises a top sheet, wherein the top sheet is adherent to the top surface of the plate; wherein the top sheet covers the opening, and wherein the top sheet comprises a first end extending outside an edge of the applicator device for allowing a user to peel the top sheet from the applicator device before an application of the protective covering.

According to an embodiment, the top sheet comprises a bonding material for bonding to the top surface of the plate.

According to an embodiment, the electronic device is a cell phone or a tablet device.

According to an embodiment, the raised section comprises a camera bump.

Disclosed herein is a method of using the applicator device of claim 1, wherein the applicator device further comprises a protective covering secured inside the chamber, and a top sheet that covers the protective covering; wherein the method comprises: removing a top sheet from the applicator device, aligning a perimeter of the opening to a perimeter of the raised section for allowing the protective covering to align and cover the raised section, exerting a pressure to release the protective covering from the back piece so that the protective covering is adherent to the raised section.

DETAILED DESCRIPTION

Figure 1:
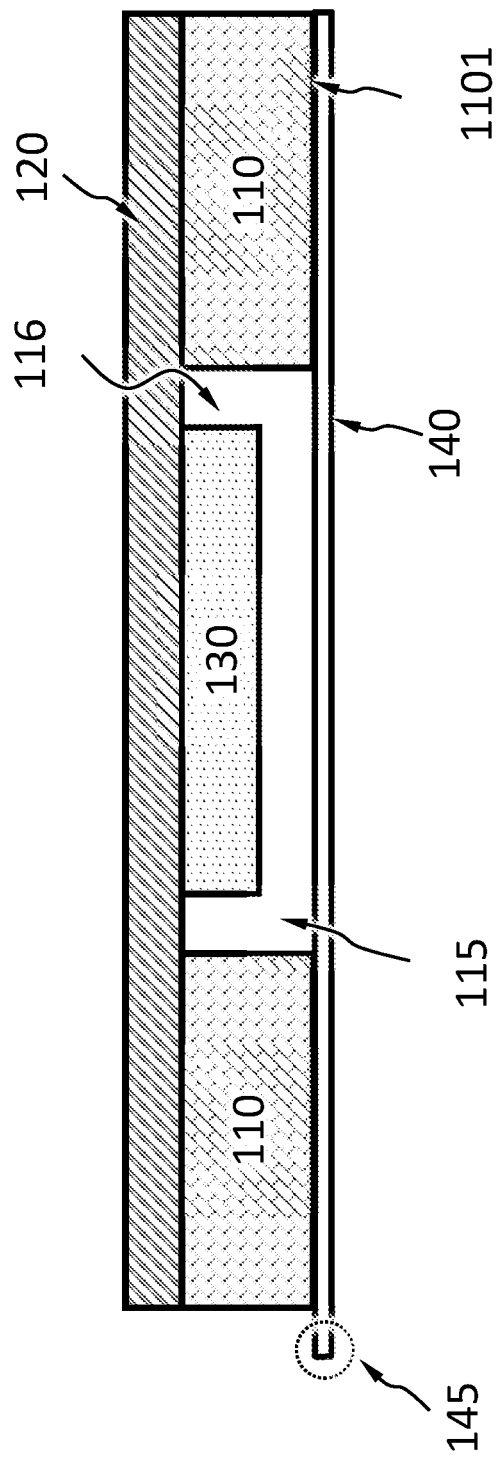
FIG. 1 schematically shows a cross-sectional view of an applicator device for a protective covering, according to an embodiment.

FIG. 1 schematically shows a cross-sectional view of an applicator device for a protective covering. According to an embodiment, the applicator device may comprise a plate 110, a back piece 120 and an opening 115 on a top surface 1101 of the plate 110. The applicator device may further comprise a top sheet 140, and a protective covering 130. According to an embodiment, the opening 115 may be a through hole across the plate 110. The opening 115 and the back piece 120 forms a chamber 116 to allow the protective covering 130 to fit inside. The chamber 116 may preferably be sized slightly larger than the protective covering 130 so that there is a gap between a sidewall of the protective covering 130 and a sidewall of the chamber 116.

According to an embodiment, the back piece 120 covers the opening 115 and supports the protective covering 130. The back piece may be a flexible sheet such as a back liner. The back liner comprises a bonding material or adhesives for bonding to the plate 110 and the protective covering 130. Preferably, the back liner bonds to all of the protective covering. According to an embodiment, the back liner may be transparent or semi-transparent to allow a user to view and align the position of the applicator device and the protective covering. The bonding material or adhesives ensures that the protective covering is secured to the back liner.

According to an embodiment, alternatively, the back piece may be an integrated part of the same material of the plate 110. The back piece forms a bottom of the chamber and allows the protective covering 130 for a raised section of the electronic device to fit inside. In some embodiments, the space enclosed by the chamber may be the same as the space of the opening; alternatively, the space enclosed by the chamber may be different from, such as smaller than, the space of the opening, depending on the positioning of the back piece with the opening.

According to an embodiment, the top sheet 140 is adherent to the top surface of the plate 110. The top sheet covers the opening 115. The top sheet comprises a first end 145 extending outside an edge of the applicator device for allowing a user to peel the top sheet from the applicator device before an application of the protective covering.

According to an embodiment, the top sheet 140 comprises a bonding material for bonding to the top surface 1101 of the plate 110. The top sheet 140 does not form contact to the protective covering 130, so that protective covering will stay secured within the chamber during peeling away the top sheet.

According to an embodiment, the protective covering 130 has a bonding material on a top surface facing the top sheet 140, and the bonding material may securely adhere the protective covering 130 to a raised section such as a camera bump.

Figure 2:
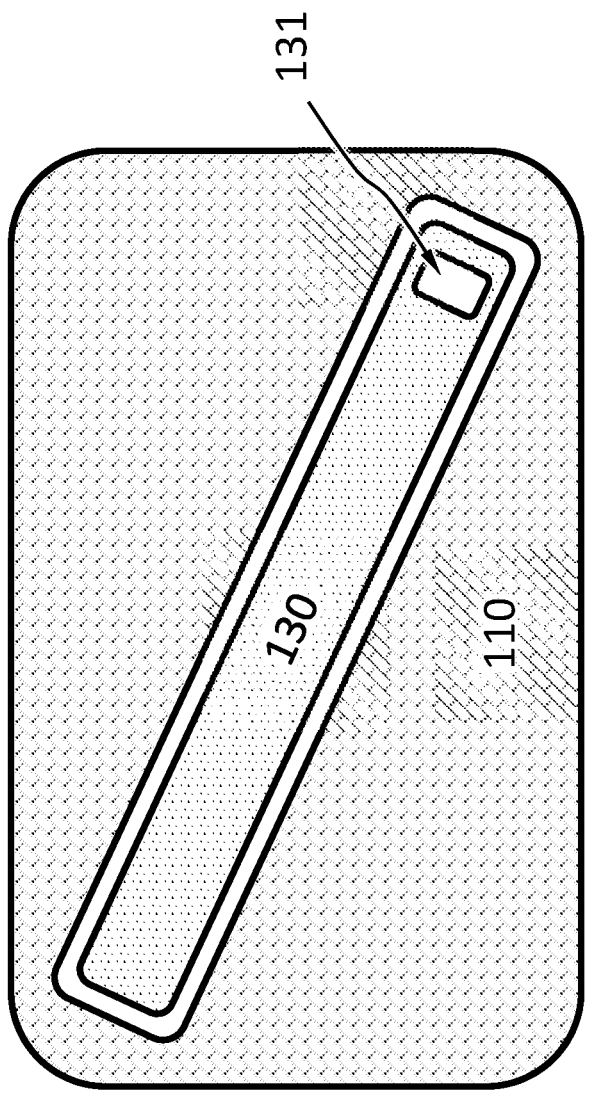
FIG. 2 schematically shows a top view of an applicator device for a protective covering, according to an embodiment.

FIG. 2 schematically shows a top view of an applicator device for a protective covering, according to an embodiment. The plate 110 may be made of a plastic or any non-plastic material that is suitable for its use. The material may be a type of plastic, such as Polypropylene (PP), Acrylonitrile Butadiene Styrene (ABS), Polyamide (Nylon), High Density Polyethylene (HDPE), Polycarbonate (PC), or ABS+PC Blend (mostly used for electronics enclosures), or a combination thereof.

Figure 3A:
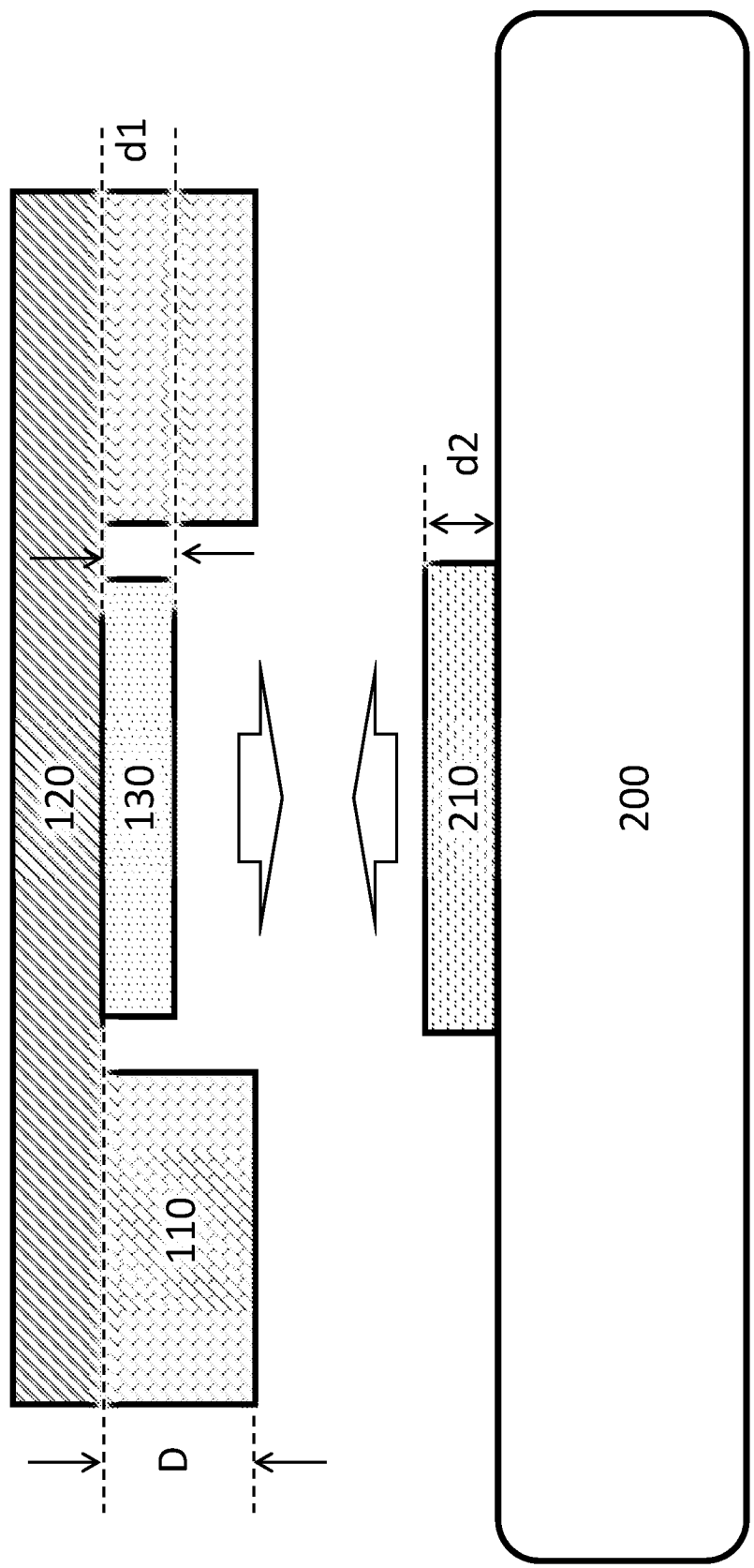
FIG. 3A schematically shows a cross-sectional view of an applicator device for a protective covering and an electronic device with a raised section to be aligned with the applicator device, according to an embodiment.
Figure 3B:
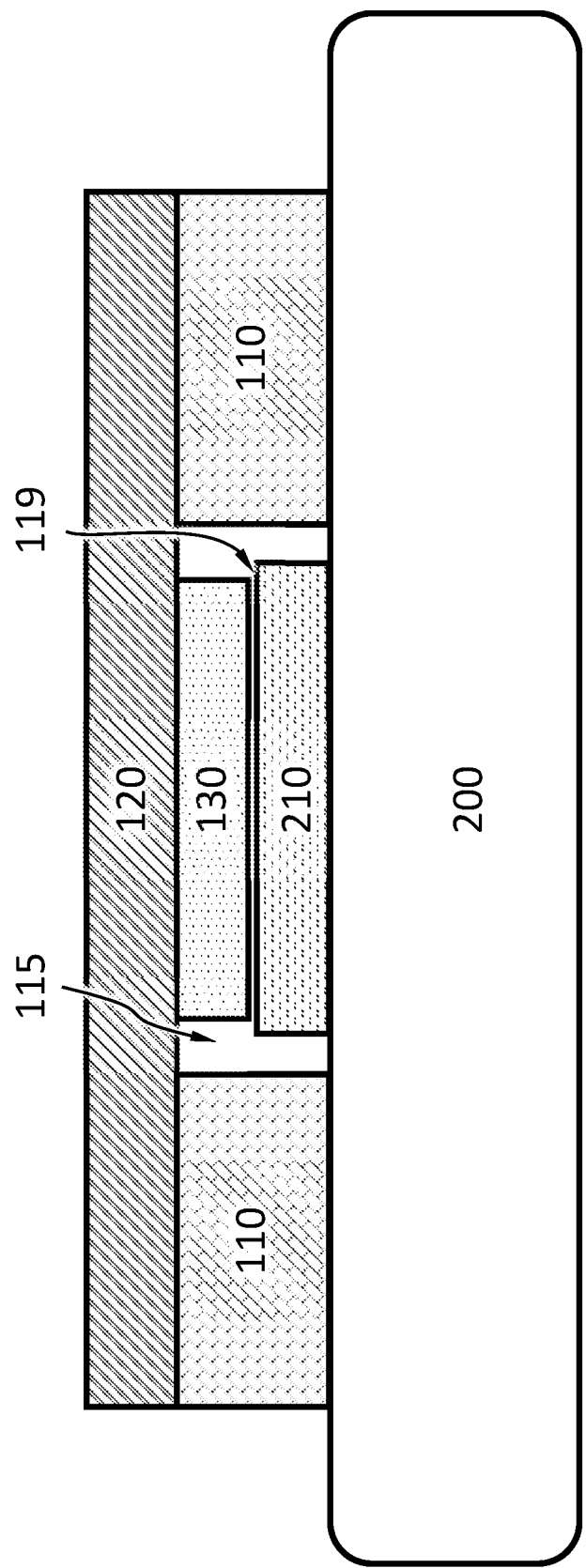
FIG. 3B schematically shows a cross-sectional view of an applicator device for applying a protective covering to an electronic device with a raised section, according to an embodiment.
Figure 3C:
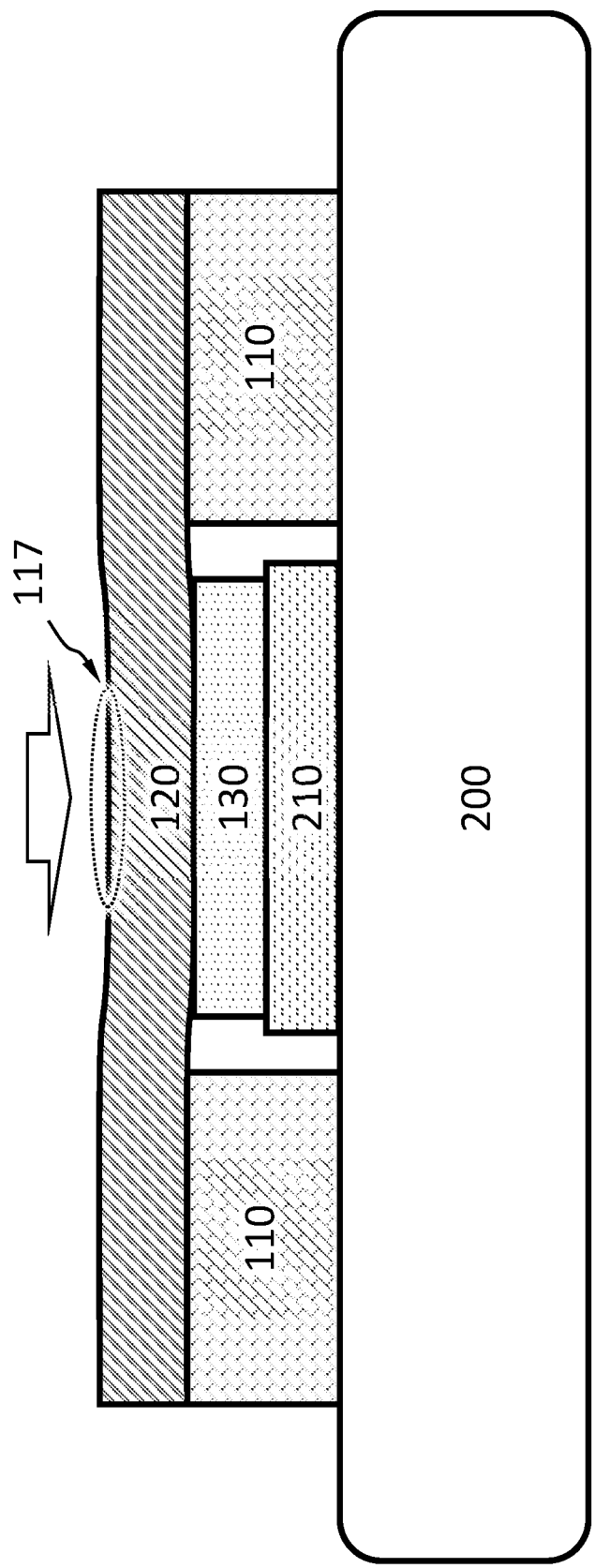
FIG. 3C schematically shows another cross-sectional view of an applicator device for applying a protective covering to an electronic device with a raised section, according to an embodiment.

As shown in FIG. 2 and FIG. 3C, the back piece 120 is bendable manually by a user through a gentle force applied to a back surface, such as on a center 117. The back piece 120 may return to its original shape after forces are removed.

As shown in FIG. 2 and FIG. 3A-3D, the protective covering 130 may comprises an opening 131. The protective covering may be a protective film, or protective covering may be a tempered glass. The opening 131 may allow a certain area such as a flash on a camera bump left without being covered, while camera lens on the camera bump being covered or protected by the protective covering.

As shown in FIG. 3A-3D, according to an embodiment, the opening 115 is sized to fit around a raised section such as a camera bump 210 of an electronic device 200. The opening 115 may preferably be sized slightly larger than the camera bump 210 so that there is a gap between a sidewall of the camera bump 210 and a sidewall of the opening 115. This allows adjustment of the placement of the application device during application of the protective covering.

As shown in FIG. 3A, according to an embodiment, a depth of the chamber D is greater than a depth of the protective covering dl. Preferably, as shown in FIG. 3A-3B, the depth of the chamber D is greater than a sum of the depth of the protective covering dl and a protrusion distance d2 of the raised section such as a camera bump 210 from a surface of the electronic device 200. This allows a gap 119 to exist when the application device is aligned and placed on top of the camera bump 210. This provides an opportunity of adjusting the placement of the applicator device before a first contact is made between the protective covering 130 with the camera bump 210, so that the protective covering is aligned better with the lens of the camera bump 210. Preferably, when the camera bump has an edge, which may or may not be slighted raised above a surface of the camera lens, the protective covering is sized to fit within the edge of the camera bump. Preferably, as shown in FIG. 3B, the protective covering is sized slightly smaller than the overall top surface of the camera lens, so that less than perfect alignment by the user will still allow the protective covering to cover the camera lens without having a portion of the protective covering sticking out of the bounds of the surface of the camera lens. During application of the protective covering, a user may apply gentle force to a back surface of the plate, such as on a center 117 of the plate 110, as shown in FIG. 3C. The gentle force will be carried toward the protective covering, to allow the protective covering to be pressed against and sealed tightly on the surface of the camera bump.

Figure 3D:
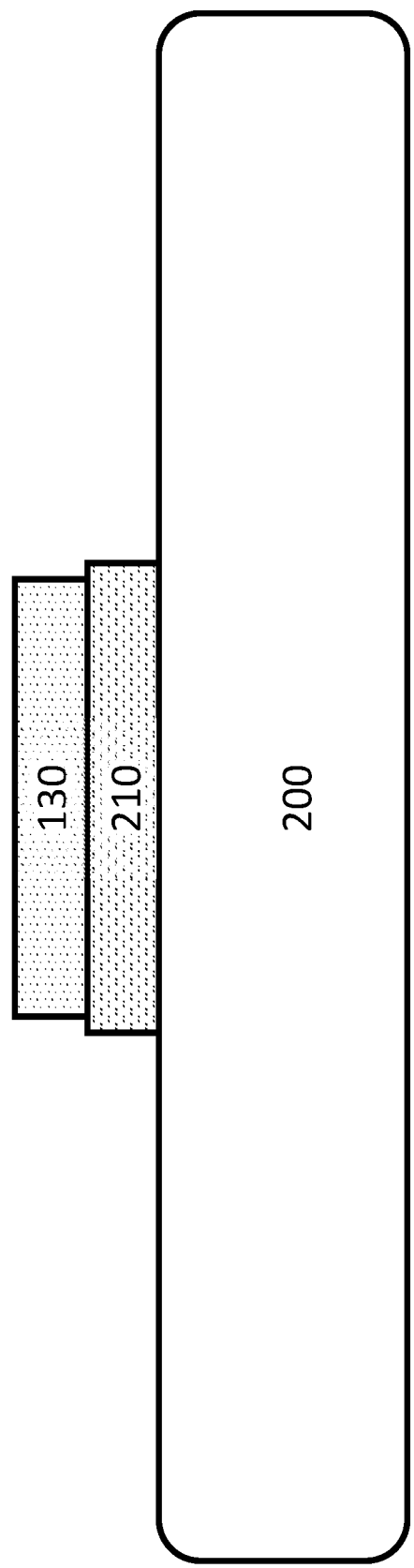
FIG. 3D schematically shows a cross-sectional view of a protective covering being adhered to a raised section of an electronic device, according to an embodiment.

As shown in FIG. 3D, after applying of the protective covering by the applicator device, the protective covering is to be released off from the back piece and adhered to the raised section of the electronic device through a lifting pressure exerted by a user's hand on the back piece.

Disclosed herein is a method of using the applicator device. After cleaning the contact surface of the camera bump, a use removes a top sheet from the applicator device. While holding the applicator device facing down, the user aligns a perimeter of the opening to a perimeter of the raised section for allowing the protective covering to align and cover the raised section. If there is an internal opening on the protective covering designed to match a flash on the camera bump, the internal opening will align to the flash. The user exerts a pressure gently on back side of the applicator device, to release the protective covering from the back piece so that the protective covering is adherent to the raised section such as the camera bump.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An applicator device for applying a protective covering for an electronic device, comprising:
   a plate, a back piece and an opening on a top surface of the plate;
   wherein the opening is sized to fit around a raised section of an electronic device;
   wherein the opening and the back piece forms a chamber to allow the protective covering for a raised section of the electronic device to fit inside;
   wherein a depth of the chamber is greater than a depth of the protective covering.

2. The applicator device of claim 1, wherein the depth of the chamber is greater than a sum of the depth of the protective covering and a protrusion distance of the raised section from a surface of the electronic device.

3. The applicator device of claim 1, wherein the back piece comprises a bonding material for bonding to the plate and the protective covering.

4. The applicator device of claim 1, further comprising the protective covering secured inside the chamber through bonding to the back piece, and wherein after applying of the protective covering by the applicator device, the protective covering is to be released off from the back piece and adhered to the raised section of the electronic device through a pressure exerted by a user's hand on the back piece.

5. The applicator device of claim 1, wherein the opening is a through hole, and the back piece is a liner.

6. The applicator device of claim 1, further comprising the protective covering that is sized to cover a portion or all of the raised section of the electronic device.

7. The applicator device of claim 1, wherein the protective covering is a protective film.

8. The applicator device of claim 1, wherein the protective covering is a tempered glass.

9. The applicator device of claim 1, wherein the protective covering comprises an internal opening.

10. The applicator device of claim 1, further comprising a top sheet, wherein the top sheet is adherent to the top surface of the plate; wherein the top sheet covers the opening, and wherein the top sheet comprises a first end extending outside an edge of the applicator device for allowing a user to peel the top sheet from the applicator device before an application of the protective covering.

11. The applicator device of claim 10, wherein the top sheet comprises a bonding material for bonding to the top surface of the plate.

12. The applicator device of claim 1, wherein the electronic device is a cell phone or a tablet device.

13. The applicator device of claim 1, wherein the raised section comprises a camera bump.

\* \* \* \* \*